United States Patent

Kearney, Jr.

[11] Patent Number: 5,887,926
[45] Date of Patent: Mar. 30, 1999

[54] LONG HANDLED TOOL HOLDER

[76] Inventor: James Michael Kearney, Jr., 131 E. High St., Jeffersonville, Ind. 47130

[21] Appl. No.: 987,847

[22] Filed: Dec. 9, 1997

[51] Int. Cl.⁶ ............................................. B60R 11/06
[52] U.S. Cl. ......................... 294/143; 224/404; 296/37.6
[58] Field of Search ................... 294/141–143, 294/146, 159–163; 296/37.1, 37.5, 37.6; 224/402–405; 312/206, 902; 206/373; 211/70.6

[56] References Cited

U.S. PATENT DOCUMENTS

| | | | |
|---|---|---|---|
| D. 300,019 | 2/1989 | Dickinson | 224/404 |
| 824,495 | 6/1906 | Marbach | 312/902 |
| 1,951,492 | 3/1934 | Schneider | 294/159 |
| 3,353,838 | 11/1967 | Schmid | 294/143 |
| 3,664,704 | 5/1972 | Ellis | 224/405 |
| 3,893,568 | 7/1975 | Lile | 224/403 |
| 4,195,889 | 4/1980 | Coyne | 312/902 |
| 4,542,930 | 9/1985 | Adams | 294/160 |
| 4,573,731 | 3/1986 | Knaack et al. | 224/404 |
| 5,411,191 | 5/1995 | Bunn, Jr. | 224/403 |

*Primary Examiner*—Dean Kramer
*Attorney, Agent, or Firm*—Middletown & Reutilinger; John F. Salazar

[57] ABSTRACT

An apparatus for holding and restraining long handled tools is described. The tool box is comprised of a plurality of longitudinally extending cylinders, the cylinders being reconfigurable for multiple different sizes or widths. The entire assembly of a plurality of cylinders is combined together such that each cylinder is securely affixed to any adjacent cylinder. This assures that the tool holder is rigidly pieced together as a single unit and may also be unconnected to resize each individual tool receiving cylinder. The assembled holder rests upon pedistals and may also be constructed with outwardly extending handles and sleeves to retain the cylinders together and provide the ability to raise and move the tool holder as a single unit.

2 Claims, 2 Drawing Sheets

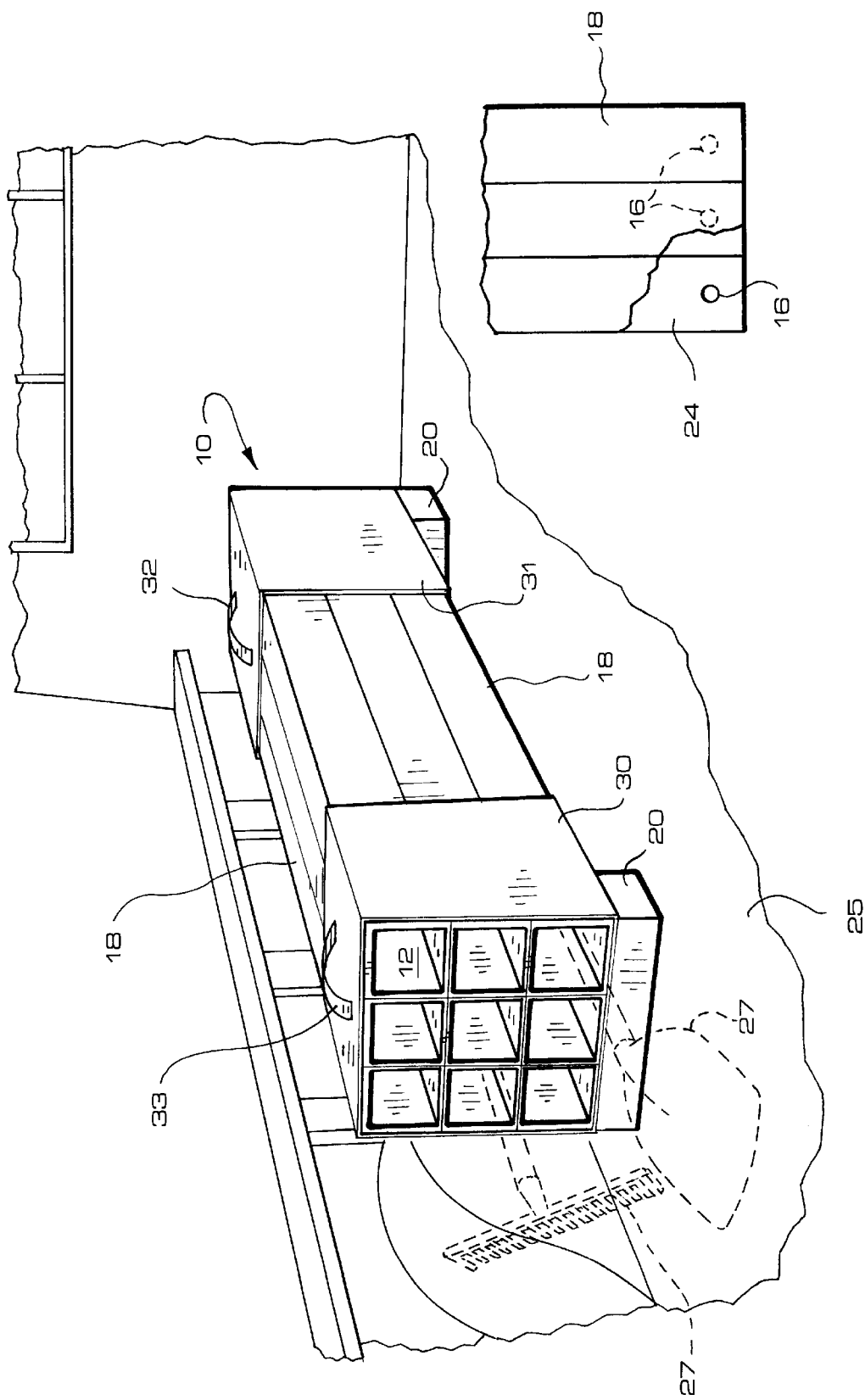

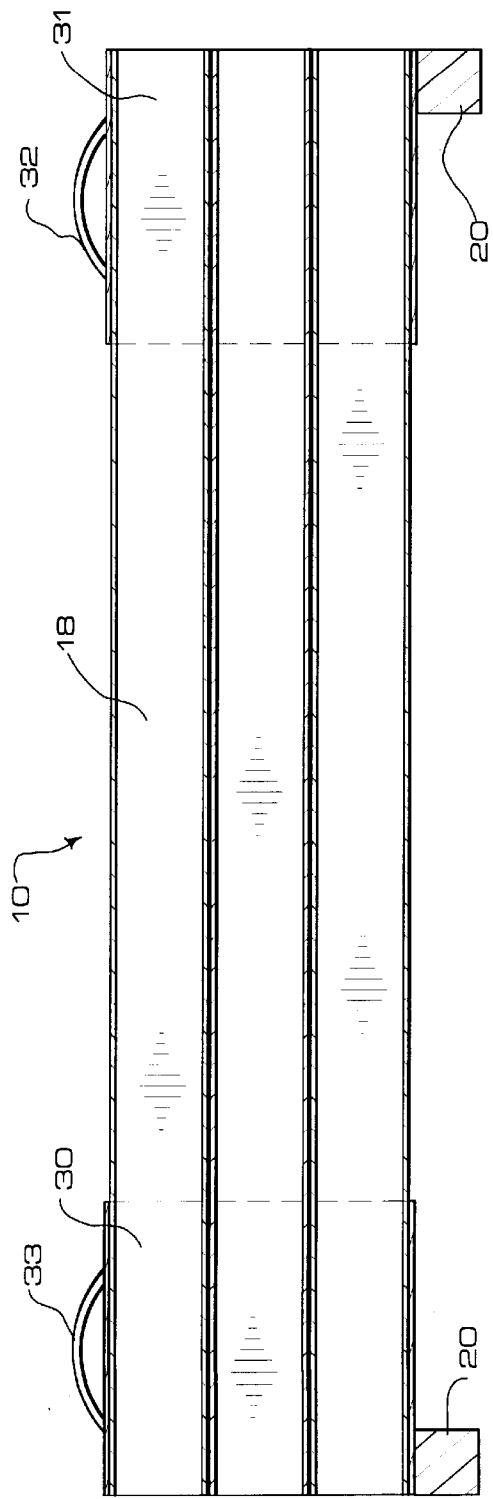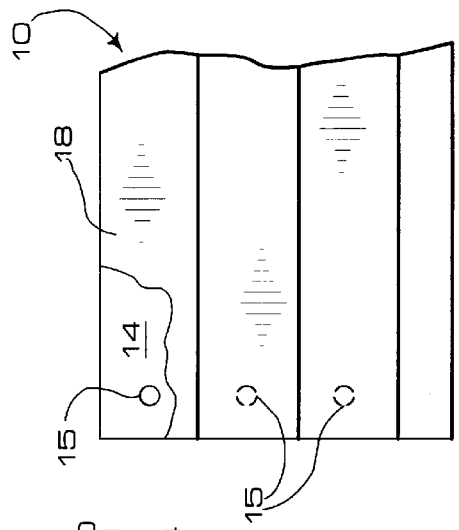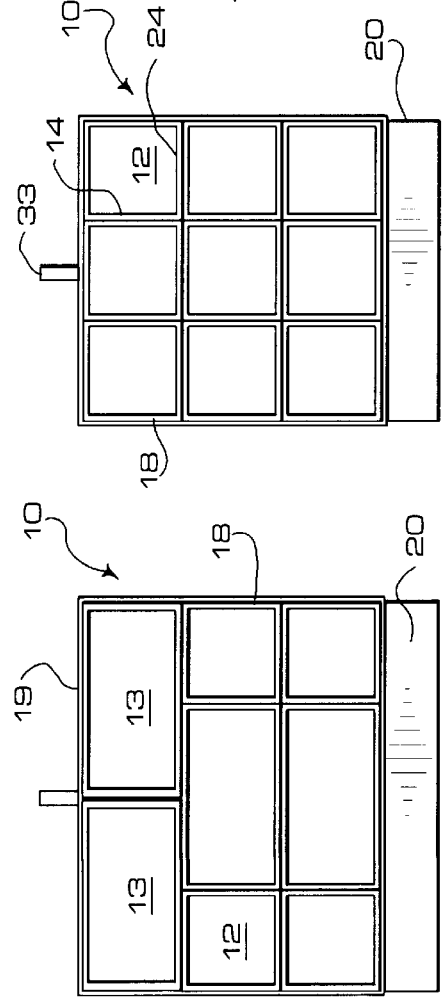

LONG HANDLED TOOL HOLDER

BACKGROUND OF THE INVENTION

1. Field of the Invention

The present invention relates to an apparatus for holding and retaining tools which have a long handle and more importantly to separate such tools while also keeping them firmly in place in a relatively small area.

2. Discussion of the Prior Art

In general, long handle tools such as shovels, rakes and the like have been difficult to retain in their proper place and also separate due to the extended length of the tool handle. Without separation of the tools, the handles may become entangled in various other items or may be scratched or marked or even possibly broken due to the lack of retention of the tools in a specified location. Additionally, as these tools are often placed in the bed of a truck, the likelihood of movement of said tools while the vehicle in motion is high due to the accelerating, turning and stopping of the vehicle.

No prior art devices adequately separates such long handle tools to prevent such movement and possible damage to the tools themselves or to the carrier or vehicle within which they are found. U.S. Pat. No. 4,531,774 teaches a truck toolbox anchor assembly wherein a toolbox is fastened directly to the bed wall of the truck, said toolbox fastened perpendicular to the truck bed walls. However, due to the short length of such toolbox, long handle tools commonly found will not fit in such a toolbox. As a result, such a toolbox which retains these long handle tools is desired to prevent the movement of the tools within a truck bed or similar carrying area.

SUMMARY OF THE INVENTION

To resolve this problem, provided herein, a long handle tool holding device is provided which retains such long handle tools and adequately separates them for retention in a specified location, the entire tool holder of which may be placed in the bed of a truck.

Accordingly, it is the main object of the present invention to provide a toolbox or other holding device for tools which have an extended length handle and to keep these tools in a small confined space.

It is another object of the present invention to provide a long handle toolbox which will adequately retain long handle tools and separate such tools to prevent the damaging thereof.

It is a further object of the present invention to provide a long handle toolbox which has varying sized retaining areas for tools with larger diameter handles or other tools which have devices attached to the handles.

In accordance with a major feature of the present invention, there is provided, in combination with a vehicle, such as a truck, having a bed, a structure for a long handle toolbox or retaining holder comprising: a plurality of longitudinally extending cylinders; means to retain said cylinders in adjacent relationship; handle means for grasping said plurality of longitudinally extending cylinders; and base support members for retaining said toolbox comprised of a plurality of longitudinally extending cylinders in a particular location.

Further, the present invention comprises a rigid toolbox for retaining tools with long handles, comprising: a plurality of longitudinally extending cylinders for receiving said handles of said tools; means for retaining said plurality of cylinders in adjacent relationship; a first and a second circumscribing sleeve, said first sleeve retained at a first distal end of said tool holder, said second sleeve retained at the opposite distal end of said tool holder; a first and a second handle extending upward from said first and said second sleeve; a first and a second pedestal affixed to the bottom of said tool holder, said first pedestal located at one end of said tool holder and said second pedestal located at the opposite distal end of said tool holder; and wherein said plurality of cylinders are reconfigurable for varying sizes of cylinders.

BRIEF DESCRIPTION OF THE DRAWINGS

A better understanding of the invention will be had upon reference to the following description in conjunction with the accompanying drawings in which like numerals refer to like parts and wherein:

FIG. 1 is a perspective view of the toolbox holder for long handle tools of the present invention;

FIG. 2 is a side view of the holder shown in FIG. 1;

FIG. 3 is an end view of the holder of FIG. 1;

FIG. 4 is an end view of a holder for long handle tools of the present invention wherein the longitudinally extending cylinders have varying sizes;

FIG. 5 is a partial cutaway view of the holder of FIG. 1; and,

FIG. 6 is a partial cutaway top view of the holder of FIG. 1.

DETAILED DESCRIPTION OF THE PREFERRED EMBODIMENT

The tool holder 10 for long handle tools 27 is shown in FIG. 1 located in the bed of truck 25. Longitudinally extending cylinders 18 are shown. While the term cylinders is used herein to define longitudinally extending spaces enclosed by a circumscribing wall, it is not meant to be specifically limited to an oval or round shape. Particularly, cylinder in this context may mean any longitudinally extending chamber bounded on all sides by a wall or plurality of walls. The holder 10 for long handled tools is comprised of a plurality of cylinders 18 within which a plurality of bounded areas 12 are formed. Plurality of cylinders 18 may be individual cylinders firmly affixed or retained in adjacent relationship or may be a holder molded as a single piece with a plurality of apertures 12 on both ends. As shown in FIG. 1, cylinders 18 are separate individual pieces and retained together by different retaining means. The benefit of having individual cylinders 18 as is shown in FIG. 1 is that the user may make his or her own configuration of long handle tool holder 10 given his or her own specific needs. As is shown in FIG. 1, cylinders 18 are in fact rectangular and have open aperture 12 available for receiving the handles of tools 27. Cylinders 18, however, may also by round in which a single rigid cylindrical sidewall will extend substantially the entire longitudinal length of the toolbox 10.

Cylinders 18 may be made of a thermoplastic resin material for easy manufacture and molding or may be of metallic construction for durability, such as aluminum or other alloy. Additionally, cylinders 18 may have differing sizes or configurations as is shown in FIGS. 3 and 4. Rectangular or square apertures 12 are shown in FIG. 1 and 3 for receiving small diameter handles of tools 27. Alternatively, as is shown in FIG. 4, substantially square cylinders 18 and rectangular cylinders 19 may be combined wherein cylinders 19 are different in shape and provide a wider aperture 13 for entry of larger diameter handles for tools.

Individual cylinders 18 and 19, shown in FIG. 4, may be pieced together and retained in adjacent relationship to form an independent unit as is shown in FIGS. 1 and 2. Retaining means to affix cylinders 18 and 19 in adjacent relationship may be completed by either manufacturing or molding the tool holder 10 in a single piece wherein a plurality of entry holes 13 and 12 are provided for accepting handles from tools or wherein cylinders 18 and 19 are individual units which are pieced together. If cylinders 18 and 19 are individual units, threaded screws or attachment means 15, shown in FIG. 5 may be inserted through sidewall 14 of cylinder 18 thereby retaining each adjacent cylinder together. Threaded screw 15 may alternatively be a retaining pin and may also be located at the opposite distal end of sidewall 14 in cylinder 18 for competent retaining at both ends of the cylinders 18. Additionally, each cylinder placed next to each other may be similarly attached to the next side by side cylinder. Further, as is shown in FIG. 6, bottom surface 24 of cylinder 18 may also receive a threaded screw or retaining pin 16 for direct attachment to the cylinder located directly below or above cylinder 18. Retaining pins or threaded screws 15 and 16 are preferably removable such that the tool holder 10 may be reconfigured at will by the user. In such configuration, apertures for receiving screws 15 and 16 must be formed in adjacent relationship, namely in the same location on the opposing side walls 14 and on bottom and top wall 24, such that insertion of a threaded screw or retaining pin extends through the aperture of one cylinder 18 and enters in a similar aperture of an adjacent cylinder.

Located at the base of tool holder 10 are pedestals 20 which may be a wood or rubber material. Pedestals 20 insure that the tool holder 10 remains raised above the bed 25 of the vehicle and also provides friction to prevent tool holder 10 from sliding thereon. Pedestals 20 may be directly attached to the bottom surface of tool holder 10 or, if sufficient weight is inherent therein, the tool holder 10 may simply lie directly upon pedestals 20. Utilization of a rubberized surface or other material which prevents sliding may be preferred to prevent the entire tool holder 10 from moving.

Also shown in FIG. 1 are sleeves 31 and 30 which encircle the entirety of tool holder 10 at each distal end. Sleeves 30 and 31 may be a nylon, vinyl or other material which may simply slide over the ends of tool holder 10. Sleeves 30 and 31 may help retain cylinders 18 and 19 in longitudinally adjacent relationship and may even be sufficient to prevent the requirement of utilizing threaded bolts or retaining pins 15 and 16. Additionally formed along the top surface of sleeves 30 and 31 are handles 32 and 33 which allows the user to raise the entire tool holder 10 from the bed 25. Handles 32 and 33 must be of sufficient strength to prevent tearing of sleeves 30 and 31 and will be preferably made of a nylon, vinyl or other meshed material.

As is shown in FIG. 1, the tool holder 10 is comprised of a plurality of 3½ inch by 3½ inch square cylinders made up of a thermoplastic material. As shown in FIG. 4, larger openings 13 for wider cylinders 19 may be utilized wherein the opening 13 is 5 or 6 inches. While the embodiment shown in FIG. 1 indicates 9 adjacent cylinders, any number of cylinders may be utilized and variations therein will be considered within this embodiment. The longitudinal length of the cylinders may be anywhere from 3 to 6 feet. Tools 27 extend outward from the end aperture 12 of the tool holder 10 and the handles are retained significantly within cylinders 18. The interior of cylinders 18 may be coated with a frictional material to prevent the free sliding of handles from within the cylinders. Such material may be a rubberized compound and may only be required in particular locations within the interior of cylinder 18 to prevent such free travel.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

I claim:

1. A rigid toolbox for long handled tools, comprising:

a plurality of longitudinally extending cylinders in side by side relationship, said cylinders having a rigid sidewall extending substantially the entire length thereof;

means for retaining said cylinders in adjacent longitudinal relationship;

at least one handle extending outward from said rigid toolbox;

a first and a second pedestal upon which said toolbox rests;

wherein said toolbox is configurable to a plurality of different size cylinders;

and further wherein said cylinders are square along the entire length thereof.

2. A rigid toolbox for long handled tools, comprising:

a plurality of longitudinally extending cylinders in side by side relationship, said cylinders having a rigid sidewall extending substantially the entire length thereof;

means for retaining said cylinders in adjacent longitudinal relationship;

at least one handle extending outward from said rigid toolbox;

a first and a second pedestal upon which said toolbox rests;

wherein said toolbox is configurable to a plurality of different size cylinders, wherein said cylinders are rectangular having a rigid top wall, bottom wall and opposing side walls, and further wherein said means for retaining said cylinders in adjacent longitudinal relationship is further comprised of:

an aperture formed in the sidewall of said cylinders in adjacent relationship;

at lease one threaded attachment screw extending through the side wall of said cylinder and entering through the adjacent aperture of the side wall of an adjacent cylinder;

an aperture formed in the top and bottom wall of cylinders in adjacent relationship;

at least one threaded attachment screw extending through the bottom wall of said cylinder and entering through the adjacent top wall of an adjacent cylinder.

* * * * *